US012487468B2

(12) United States Patent
Ye et al.

(10) Patent No.: US 12,487,468 B2
(45) Date of Patent: Dec. 2, 2025

(54) REFLECTION-ASYMMETRIC METAL GRATING POLARIZATION BEAM SPLITTER

(71) Applicant: Shanghai Jiao Tong University, Shanghai (CN)

(72) Inventors: Zhicheng Ye, Shanghai (CN); Jun Zheng, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 754 days.

(21) Appl. No.: 17/920,394

(22) PCT Filed: Feb. 27, 2020

(86) PCT No.: PCT/CN2020/076898
§ 371 (c)(1),
(2) Date: Oct. 20, 2022

(87) PCT Pub. No.: WO2021/138981
PCT Pub. Date: Jul. 15, 2021

(65) Prior Publication Data
US 2023/0161170 A1    May 25, 2023

(30) Foreign Application Priority Data
Jan. 8, 2020    (CN) .......................... 202010018501.8

(51) Int. Cl.
G02B 27/28    (2006.01)
G02B 5/18    (2006.01)
G02B 5/30    (2006.01)

(52) U.S. Cl.
CPC ......... *G02B 27/283* (2013.01); *G02B 5/1861* (2013.01); *G02B 5/3058* (2013.01)

(58) Field of Classification Search
CPC .................................................... G02B 5/3058
See application file for complete search history.

(56) References Cited

U.S. PATENT DOCUMENTS 10,527,768 B2    1/2020    Takahashi
2004/0264350 A1    12/2004    Ueki et al.
(Continued)

FOREIGN PATENT DOCUMENTS

CN    1804667 A    7/2006
CN    101876722 A    11/2010
(Continued)

OTHER PUBLICATIONS

Y. Ekinci et al., "Bilayer Al wire-grids as broadband and high-performance polarizers," Optics Express, vol. 14, pp. 2323-2334 (Mar. 20, 2006).

*Primary Examiner* — Cara E Rakowski
(74) *Attorney, Agent, or Firm* — Mei & Mark LLP; Manni Li

(57) ABSTRACT

The reflection-asymmetric metal grating polarization beam splitter comprises a substrate, and a first grating composed of first mediums and first metals, and first light-absorbing materials are provided on the upper surfaces or side surfaces of the first metals. A plurality of second materials are provided at equal intervals longitudinally along the upper surfaces of the first metals to form a second grating. The first light-absorbing materials are closely provided on the upper surfaces of the first metals between two adjacent second materials, and second light-absorbing materials are closely provided on the upper surfaces and/or side surfaces of the second materials. The second materials have a greater thickness than the first light-absorbing materials. Second mediums are filled in spaces between adjacent second materials above the first light-absorbing materials.

6 Claims, 8 Drawing Sheets

(56) References Cited

U.S. PATENT DOCUMENTS

| | | | | |
|---|---|---|---|---|
| 2007/0019292 | A1* | 1/2007 | Kim | G02F 1/133514 |
| | | | | 359/487.03 |
| 2008/0117509 | A1* | 5/2008 | Hayashi | G02B 5/3058 |
| | | | | 359/485.05 |
| 2011/0115991 | A1 | 5/2011 | Sawaki | |
| 2012/0105745 | A1 | 5/2012 | Kumai | |
| 2013/0215506 | A1* | 8/2013 | Yao | G02B 5/3058 |
| | | | | 359/485.03 |
| 2017/0045658 | A1* | 2/2017 | Kumai | G02B 5/003 |

FOREIGN PATENT DOCUMENTS

| | | |
|---|---|---|
| CN | 103777274 B | 1/2016 |
| CN | 108020952 A | 5/2018 |
| CN | 110361801 A | 10/2019 |

\* cited by examiner

REFLECTION-ASYMMETRIC METAL GRATING POLARIZATION BEAM SPLITTER

CROSS-REFERENCE TO RELATED APPLICATIONS

The subject application is a U.S. national stage of PCT/CN2020/076898 filed on Feb. 27, 2020, which claims priority on Chinese Patent Application No. CN 202010018501.8 filed on Jan. 8, 2020. The contents and subject matter of the PCT international application and the Chinese priority application are incorporated herein by reference.

TECHNICAL FIELD

The invention relates to the technical field of polarized light beam splitters, and in particular to a reflection-asymmetric metal grating polarization beam splitter.

BACKGROUND ART

Polarized light is widely used in modern optical technologies and applications, such as optical communication, optical storage, optical sensing and display, and the like. Polarized light beam splitters can divide incident non-polarized light into two beams of light with their polarization directions perpendicular to each other.

With the current requirements for high efficiency, miniaturization, and integration of optical devices, as well as the development of micro Nano processing technologies, sub-wavelength gratings with excellent polarization characteristics have attracted extensive attention and research, which are characterized by small size, easy integration, and flexible design.

In terms of material, subwavelength gratings comprise medium gratings and metal gratings. Due to the limitation of the medium refractive index, medium gratings usually work in the field of infrared and mid-infrared light waves, whose polarization effect is caused by the difference between the equivalent refractive indexes of the gratings for TM (transverse magnetic field parallel to a first metal grating line direction) and TE (transverse electric field parallel to the first metal grating line direction) polarized light. Under the interference effect, TM and TE light are diffracted backward or forward to a specific direction related to the light wavelength. Therefore, the medium gratings can only be made into polarization beam splitters for narrowband and specific incident angles, with the extinction ratio difficult to improve. For example, the Chinese patent CN1804667 titled "Quartz transmission polarization beam splitting grating with 1550 nanometer wavelength" gives the specific structure parameters of a quartz transmission polarization beam splitter grating for the 1550 nanometer wavelength and a specific incident angle, wherein TM light and TE light transmit and are diffracted to different directions, with the extinction ratio of about hundreds to thousands and difficult to reach ten thousand.

In order to obtain polarization beam splitters with the broadband and the high extinction ratio, it is necessary to make use of the metal gratings. The metal gratings support surface plasma waves, and TM polarized light of any wavelength can excite the surface plasma waveguide mode to be propagated in medium slits of the metal gratings. TE polarized light with a wavelength less than a certain cutoff wavelength can enter the medium slits of the metal gratings through the normal waveguide mode, while TE light with a wavelength greater than the cutoff wavelength cannot enter the gratings. Therefore, designing the metal grating period can produce the beam splitting effect of broadband TM polarized light transmission and broadband TE polarized light reflection. The metal gratings fundamentally differ from the traditional crystal, multilayer film, or medium gratings in the physical mechanism. Surface plasma polarization beam splitters manufactured on this basis are not only characterized by a wide spectrum in performance but also simple in the preparation process, suitable for large-scale production, and easy to integrate. Y. Ekinci et al. ("Bilayer Al wire-grids as broadband and high-performance polarizers", Y. Ekinci, H. Solak, C. David, and H. Sigg, Optics Express 14, 2323(2006)) studied the transmission properties of 100 nm period bilayer metal wire grids for visible light, where TM light has a transmittance of about 50%, the extinction ratio is about 10,000 to 100,000, and TE light has a reflection efficiency of as high as 90%. Most of the metal gratings currently studied have the property of high reflection of TE light, which will cause devices using such polarizers to have a high reflection of ambient light.

How to make use of the polarization characteristics of the metal gratings to generate high TM light transmission and controllably generate high or low TE light reflection is related to whether the metal polarizers can be used in some fields. For example, the polarization beam splitters in display devices are expected to have a high transmission polarization suppression ratio and a low reflection efficiency as well.

SUMMARY OF THE INVENTION

In order to overcome the shortcomings in the prior art, the invention aims to provide a reflection-asymmetric metal grating polarization beam splitter which can solve the above problems.

Technical principles: A reflection-asymmetric metal grating comprises a first grating composed of first metals and first mediums, light-absorbing materials, and a second grating located on the first metals.

The width of first medium slits is smaller than a minimum mode cutoff width corresponding to transverse electric field polarized light of a working wavelength, so that TE polarized light (where the electric field is parallel to the line direction of a first metal-first medium grating located on the lower layer) of the working wavelength cannot transmit, while TM light (where the magnetic field is parallel to the line direction of the first metal-first medium grating located on the lower layer) can pass through the first medium slits and transmit efficiently in the surface plasma waveguide mode. TE polarized light incident from the grating surface is absorbed by utilizing the light absorption performance of second light-absorbing materials on second materials. Further, the second grating distributed periodically along the lines is provided on the metal grating lines. At this time, TE light will also enter second medium slits and be absorbed by the first light-absorbing materials, while TM light cannot enter the second medium slits, which has little impact on the transmission efficiency. Because the other surface is not provided with the light-absorbing materials or the second grating, incident TE light from this surface is highly reflected. Finally, a polarization beam splitting with low reflectance of TE light and TM light and high efficiency TM light transmission for light incident from the grating surface, and a polarization beam splitting with high efficiency TE light reflection and high efficiency TM light transmission for light incident from the substrate surface, are formed. The invention can realize a polarization beam splitting with low TE and TM light reflectance or high TE light reflectance and high transmission polarization suppression ratio at broadband.

Technical solutions: The purposes of the invention are realized through the following technical solutions.

A reflection-asymmetric metal grating polarization beam splitter comprises a substrate, first mediums and first metals. A plurality of the first metals and the first mediums are provided transversely side by side at equal intervals on an upper surface of the substrate to form a first grating, and light-absorbing materials are provided on the upper surfaces of the first metals. The width of the first mediums meets a mode cutoff of incident light with an electric field direction parallel to first metal grating lines, and a grating period of the first grating meets the requirement that a diffraction angle in the air at the incident light waveband is greater than 90 degrees.

Preferably, the first metals of long strip shape have the same width as the first mediums, and the light-absorbing materials have the same width as the first metals.

Preferably, first light-absorbing material sidewalls are closely provided on transverse sidewall surfaces of the first metals and the light-absorbing materials.

Preferably, the substrate is a material transparent to incident light, such as $SiO_2$, the first mediums are air or a material transparent to incident light, such as air, PMMA, $SiO_2$, PC, quartz, or PET, the first metals are Al, and the light-absorbing materials are metal tungsten or boron carbide.

Preferably, a plurality of the second materials are provided at equal intervals longitudinally along the upper surfaces of the first metals to form a second grating, and the light-absorbing materials are closely provided on the upper surfaces of the first metals between two adjacent second materials. The second materials have a greater thickness than the light-absorbing materials, second mediums are filled in spaces between adjacent second materials above the light-absorbing materials. The width of the second mediums meets a mode cutoff of incident light that makes a magnetic field direction parallel to the first metal grating line direction, and a grating period of the second grating meets the requirement that a diffraction angle in the air at the incident light working waveband is greater than 90 degrees.

Preferably, a plurality of the second materials are also provided at equal intervals longitudinally along the upper surfaces of the first metals to form a second grating. The light-absorbing materials comprise first light-absorbing materials and second light-absorbing materials, the first light-absorbing materials are closely provided on the upper/side surfaces of the first metals between two adjacent second materials, and the second light-absorbing materials are closely provided on the upper surfaces of the second materials. The second materials have a greater thickness than the first light-absorbing materials, the second mediums are filled in spaces between adjacent second materials above the first light-absorbing materials. The width of the second mediums meets the mode cutoff of incident light that makes the magnetic field parallel to the first metal grating line direction, and the period of the second grating meets the requirement that the diffraction angle in the air at the incident light working waveband is greater than 90 degrees.

Therefore, the beam splitter is composed of a plurality of repeated grating unit packages. The grating unit comprises a first grating structure composed of the first mediums, the first metals and the first light-absorbing materials, and the substrate located below the first grating structure. A second grating structure of metal-light-absorbing material-medium comprises the first metals at the bottom, the second mediums and the second materials located on the top of the first metals and adjacent to each other at left and right positions, the first light-absorbing materials located at the bottom of the second mediums, and the second light-absorbing materials located on the top of the second materials.

Wherein, the first metals, the first mediums, and the first metals constitute the metal-first medium slit-metal waveguide and the first grating. The second materials, the second mediums and the second materials constitute the metal-second medium slit-metal (or medium) waveguide and the second grating.

The width of the first medium slits is smaller than the minimum mode cutoff width corresponding to transverse electric field polarized light of the working wavelength, so that TE polarized light (where the electric field is parallel to the first metal-first medium grating lines located on the lower layer) of the working wavelength cannot transmit. The TE light will be absorbed by the second light-absorbing materials on the top layer, and at the same time will enter the second medium slits to be absorbed by the first light-absorbing materials. Therefore, TE polarized light is largely absorbed and is reflected in a small part.

Preferably, at least one of the first metal layer and the second material layer has a thickness greater than a mode penetration depth of TE light of the working waveband.

Preferably, on the same first metal line, second light-absorbing material sidewalls are closely provided on the longitudinal sidewall surfaces of the second materials.

Preferably, the substrate is silicon dioxide, the first mediums, and the second mediums are a material transparent to incident light, such as air, PMMA, $SiO_2$, PC, quartz, or PET, the first metals are aluminum, the second materials are aluminum, metal tungsten or silicon dioxide, and the light-absorbing materials are tungsten.

Preferably, the substrate is a material transparent to incident light, such as silicon dioxide, the first mediums and the second mediums are air or a material transparent to incident light, such as air, PMMA, $SiO_2$, PC, quartz, or PET, the first metals are aluminum, the second materials are aluminum, metal tungsten or silicon dioxide, and the first light-absorbing materials and the second light-absorbing materials are tungsten, gallium arsenide, boron carbide, or composite materials thereof.

Preferably, the width of the first mediums is not greater than that of the second grating structure of metal-light-absorbing material-medium.

Preferably, the width of the second mediums is not greater than a second grating period on the upper layer minus the width of the second materials, and the side surfaces of the second medium grating can have the second light-absorbing materials.

Further, side surfaces of the second grating structure of metal-light-absorbing material-medium can have the second light-absorbing materials.

Preferably, the height of the first mediums meets the interference cancellation condition of the Fabry Perot resonator, so that TM reflected light of the working wavelength is minimized.

Preferably, the first metals are a single-layer metal or a mixed multilayer film containing metal, and the second materials can be a single-layer metal, a medium, or a mixed multilayer metal-medium film.

Preferably, the first mediums are a material transparent to the working wavelength, and the second mediums are a material transparent to the working wavelength. The two kinds of mediums are single-layer homogeneous materials or are composed of multilayer materials with different structures.

Preferably, the first mediums have a height from the top of the substrate to the top of the second light-absorbing materials, and the second mediums have a height from the top of the first light-absorbing materials to the top of the second light-absorbing materials.

Preferably, the upper and lower gratings can have the same or different thicknesses and material types. In addition, the gratings can also comprise a single layer or multiple layers where each layer can have a different structure. Each layer can also be a mixed multilayer material grating.

Working principle: The first order diffracted light of the working wavelength has a wavenumber parallel to the grating surface, which is greater than the wavenumber of the light in the air or the medium directly contacting the grating, that is, the diffracted light cannot exist in the air or the substrate medium contacting the grating. Moreover, only TM polarized light can enter the slits and transmit, while TE polarized light cannot enter the slits and can only be reflected, thus forming the polarization beam splitting of TM transmission and TE reflection. The existence of diffraction in the air is described by Formula 1, while the existence of diffraction in the substrate is described by Formula 2, where $n_0$ is the refractive index of air, $n_s$ is the refractive index of the substrate, $\theta$ is the incident angle of incident light from the air surface, T is the grating period, and $k_0$ is the wavenumber of light in vacuum.

$$k_0 n_0 + k_0 n_o \sin\theta < \frac{2\pi}{T} \quad (1)$$

$$k_0 n_s + k_0 n_o \sin\theta < \frac{2\pi}{T} \quad (2)$$

Further, a layer of light-absorbing material (such as metal tungsten) is superimposed onto the metal lines of the layer of grating to absorb TE light, thereby greatly reducing the reflectance of TE polarized light. Since TM light enters the grating mainly through the air slits and transmits, the metal tungsten has little effect on TM polarized light.

Another layer of grating can also is superimposed onto the metal lines of this layer of grating, with the grating direction perpendicular to the direction of the metal grating on the lower layer. Therefore, for the grating on the upper layer, the original TE light is TM light, which can enter the air or medium slits of the grating on the upper layer.

The light-absorbing materials (such as metal tungsten) are attached to the bottom of the metal grating on the upper layer to absorb light. Because these structures on the upper layer are located on the top of the metal grating on the lower layer and do not affect the first medium slits, the transmission of the original TM light has little change.

Compared with the prior art, the invention has the following beneficial effects:
(1). The polarization beam splitter grating has only 0 order diffraction in reflection and transmission, and can transmit and reflect TM polarized incident light and TE polarized incident light respectively. The bilayer metal grating structure is adopted, so that TE light incident from the grating surface is efficiently absorbed in the second grating structure of metal or medium-light-absorbing material-medium, on the upper layer, thereby obtaining a high transmission polarization suppression ratio while greatly decreasing the reflection efficiency of light. TE light incident from the substrate surface is directly and efficiently reflected by the first metal-medium grating on the lower layer.
(2). There are simple processes, low cost, and suitability for mass production.
(3). There are good polarized light beam splitting characteristics, and stable and reliable performances. The beam splitting performances of a wide spectrum, low reflection on one surface/high reflection on the other surface, and high transmission and high transmission polarization ratio can be achieved through simple parameter design.

1: substrate; 2: first medium; 3: first metal; 4. *a*: first light-absorbing material; 4. *b*: second medium; 5. *a*: second material; 5. *b* second light-absorbing material; 6: first light-absorbing material sidewall; 7: second light-absorbing material sidewall; 8: incident TE light; 9: weak TE reflected light; 10: weak TE transmission light; 11: incident TM light; 12: weak TM reflected light; 13: strong TM transmission light.

DETAILED DESCRIPTION OF THE INVENTION

For the purposes, technical solutions, and advantages of embodiments of the invention to be clearer, the technical solutions in the embodiments of the invention will be clearly and completely described below in combination with the accompanying drawings in the embodiments of the invention. It is obvious that the described embodiments are some of the embodiments of the invention but not all of them. All other embodiments obtained by those skilled in the art without creative work done, based on the embodiments of the invention, fall within the protection scope of the invention.

Figure 1:
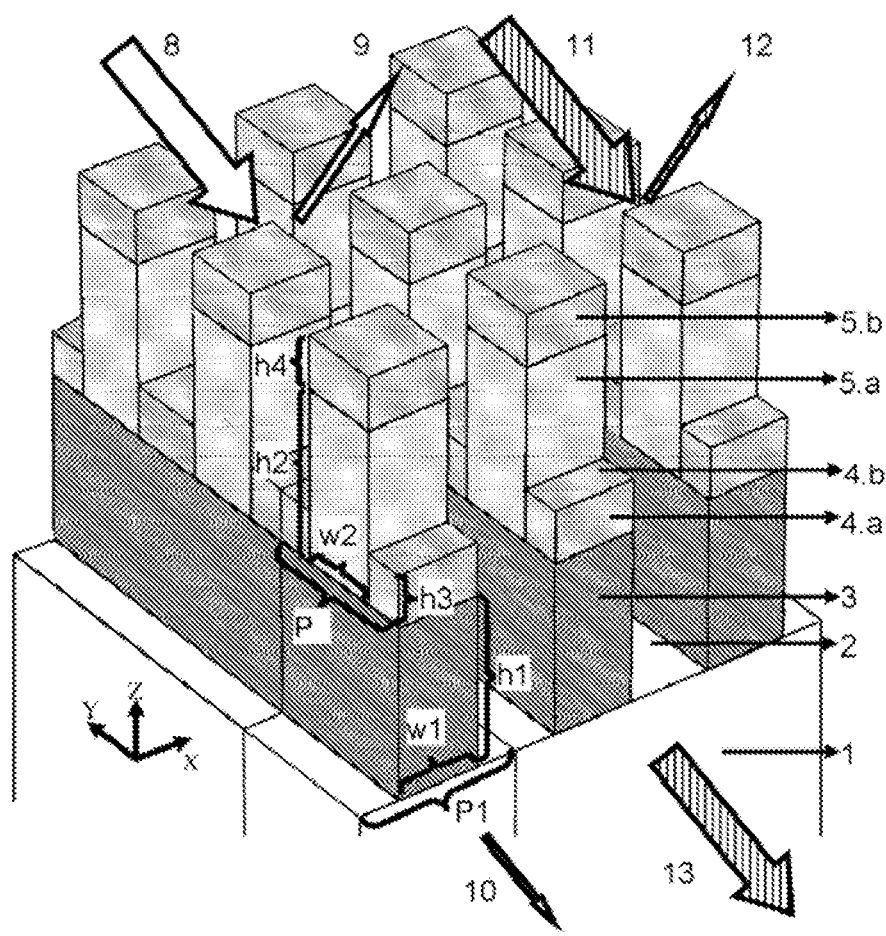
FIG. 1 is a schematic diagram of a geometric structure of a reflection-asymmetric metal grating polarization beam splitter of the invention.

Referring to FIG. 1, FIG. 1 is a schematic diagram of a geometric structure of a reflection-asymmetric metal grating polarization beam splitter of the application, wherein the beam splitter includes a substrate 1, first mediums 2, first metals 3, first light-absorbing materials 4. *a*, second mediums 4. *b*, second materials 5. *a*, second light-absorbing materials 5. *b*, incident TE light 8, weak TE reflected light 9, weak TE transmission light 10, incident TM light 11, weak TM reflected light 12, and strong TM transmission light 13.

Embodiment 1

A one-dimensional aluminum-tungsten grating is shown. The reflection of TE light is suppressed when light is incident from a grating surface, and TE light is highly reflected when light is incident from a substrate surface, with the same high transmission polarization suppression ratio occurring for both conditions.

Figure 2:
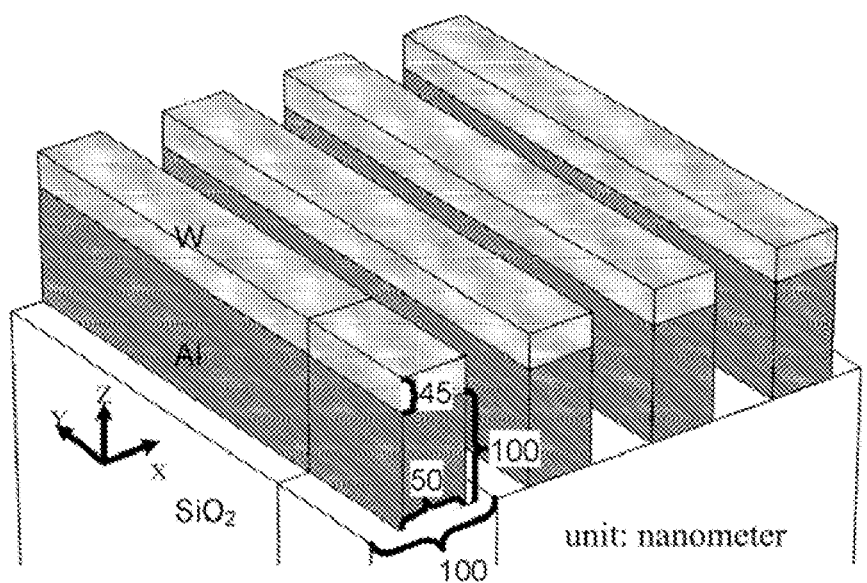
FIG. 2 is a schematic diagram of a first embodiment of a metal grating polarization beam splitter.
Figure 3:
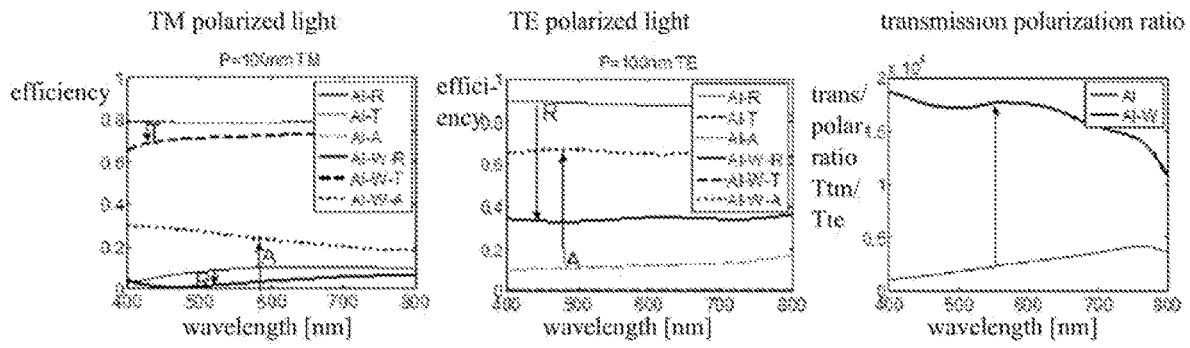
FIG. 3 shows spectrum charts of reflection, transmission, and transmission polarization ratio of a one-dimensional aluminum-tungsten grating obtained by the simulation when light is incident from a grating surface in the first embodiment.
Figure 4:
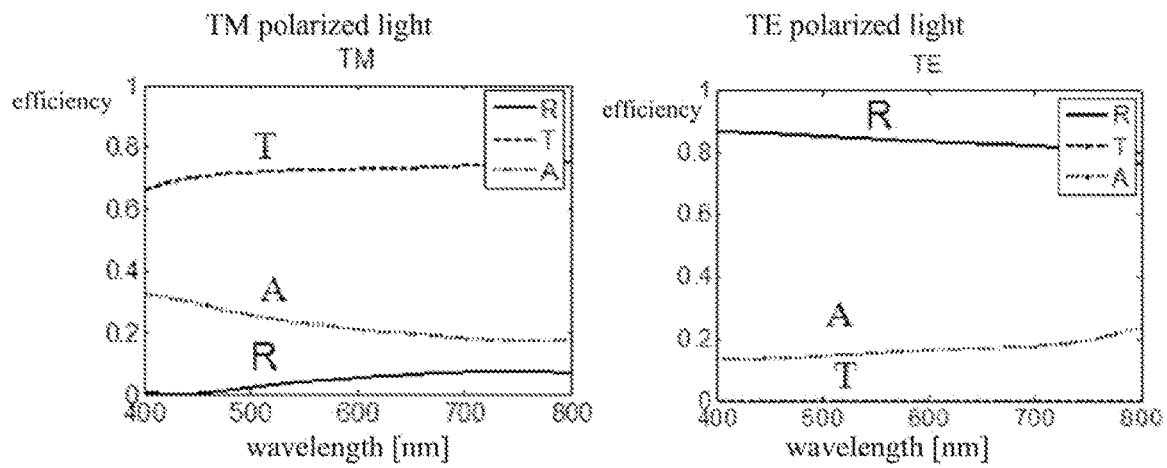
FIG. 4 shows spectrum charts of reflection, transmission, and transmission polarization ratio of the one-dimensional aluminum-tungsten grating obtained by the simulation when light is incident from a substrate surface in the first embodiment.

FIGS. 2 to 4 respectively show a schematic structure diagram of a one-dimensional aluminum-tungsten grating, and spectrum charts of reflection, transmission, and absorption in the visible light range obtained through the commercial software COMSOL, as well as simulation results of the transmission polarization ratio. The lower layer of the polarization beam splitter is a first grating composed of the first metal aluminum and the first mediums (which are a material transparent to incident light or a working wavelength, such as air, PMMA (polymethyl methacrylate), SiO$_2$ (silicon dioxide), PC (polycarbonate), quartz, or PET (polyester resin)). The direction of the grating period is along the x-axis, and aluminum lines extend along the y-axis direction. The period P1 is 100 nm (nanometers). The metal aluminum lines each have a length of half the period (that is, w1=50 nm), and a thickness h1 of 100 nm. The first materials on the aluminum lines are tungsten with a thickness h2 of 45 nm.

Referring to FIG. 3, spectrum charts of a one-dimensional aluminum grating are represented by thin lines, and those of a one-dimensional aluminum-tungsten grating are represented by thick lines. When light is incident from the grating surface, the simulation results show that the one-dimensional aluminum grating without tungsten has a TE light reflectance of as high as 90% and a TM light transmittance of about 80%. For the one-dimensional aluminum-tungsten grating with metal tungsten, the reflection efficiency of TE light is greatly decreased to about 35%, the transmission efficiency of TM light is only decreased to about 73%, the transmission efficiency of TE light is decreased by more than one order of magnitude, and the transmission polarization ratio is increased to 10,000 to 19,000. It can be seen that compared with the one-dimensional aluminum grating, the one-dimensional aluminum-tungsten grating increases the transmission polarization ratio by 4 to 21 times, suppresses about 60% of TE reflected light, and also decreases the reflection efficiency of TM light by about a half.

Referring to FIG. 4, for the one-dimensional aluminum-tungsten grating, when the incident light is incident from the substrate surface, the transmission efficiencies do not change, the reflection efficiency of TM light increases, and the reflection efficiency of TE light reaches about 90%.

Embodiment 2

Figure 5:
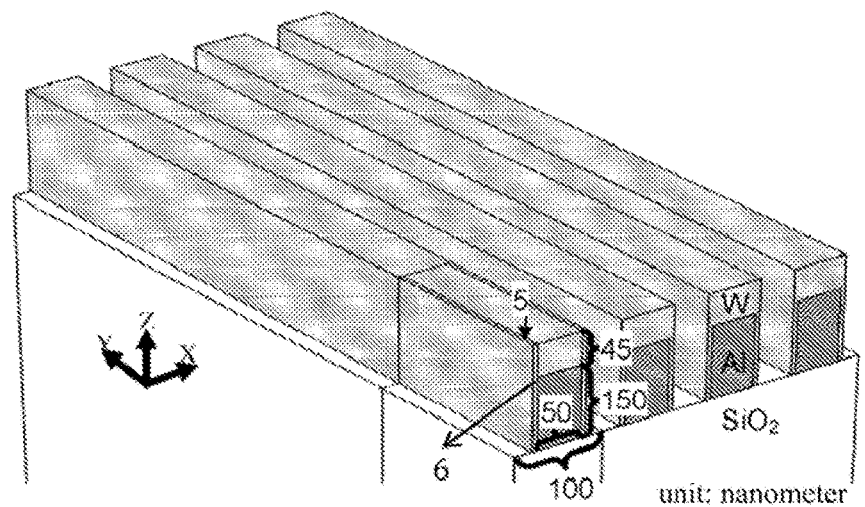
FIG. 5 is a schematic diagram of a second embodiment of the metal grating polarization beam splitter.
Figure 6:
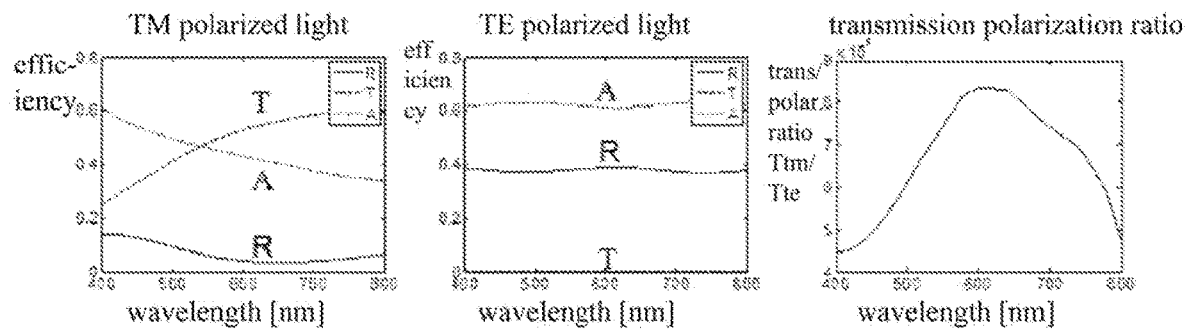
FIG. 6 shows spectrum charts of reflection, transmission, and transmission polarization ratio of a one-dimensional aluminum-tungsten grating with sidewalls obtained by the simulation when light is incident from the grating surface in the second embodiment.

Referring to FIGS. 5 and 6, based on Embodiment 1, the thickness of the aluminum lines is increased to 150 nm, and at the same time, the aluminum lines each have first light-absorbing material sidewalls 6 with a thickness of 5 nm on their edges, with the first light-absorbing material sidewalls 6 made of metal tungsten.

FIG. 5 shows a schematic structure diagram of a composite grating, whose structure parameters are the same as those of the one-dimensional aluminum-tungsten grating in Embodiment 1, except that the thickness of the aluminum layer grating is increased to 150 nm and the aluminum lines each have 5 nm tungsten sidewalls.

FIG. 6 shows the results of a simulation embodiment through the commercial software COMSOL, where light is incident from the grating surface. The simulation results show that the increase in the thickness of the aluminum layers has little effect on the reflection and transmission efficiencies of TM polarized light and the reflection efficiency of TE light, but greatly decreases the transmission efficiency of TE light, thereby increasing the transmission polarization ratio by ~41 times. Thin sidewalls have little effect on the results.

Embodiment 3

Figure 7:
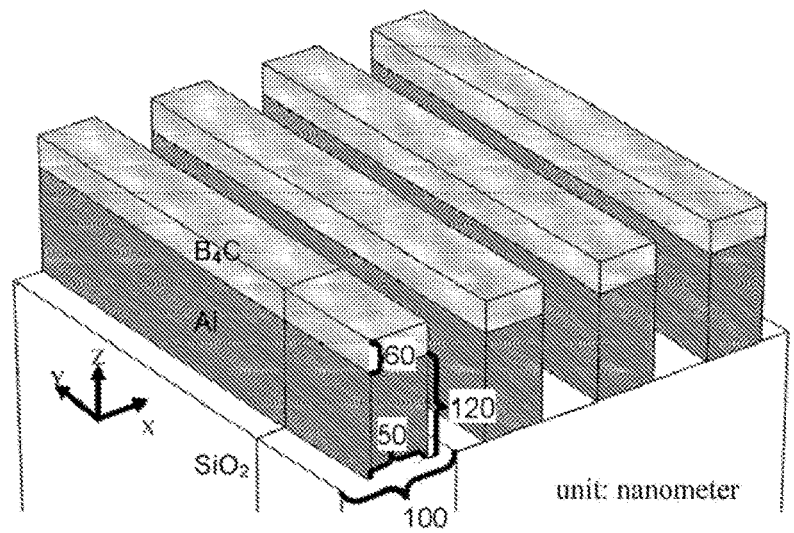
FIG. 7 is a schematic diagram of a third embodiment of the metal grating polarization beam splitter.
Figure 8:
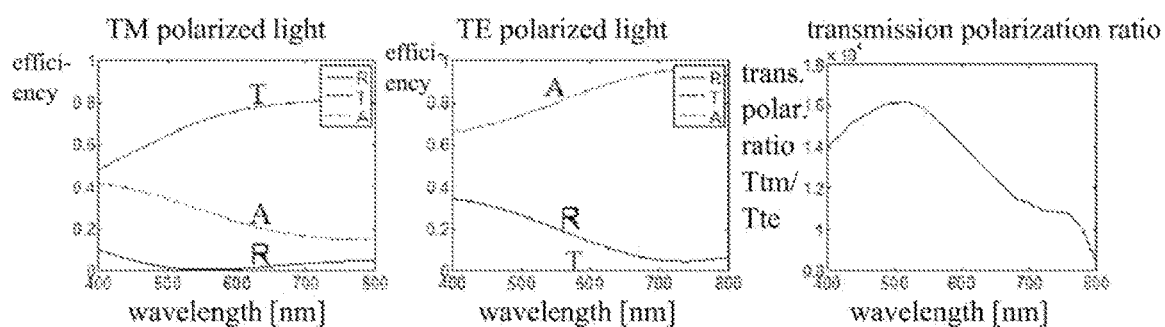
FIG. 8 shows spectrum charts of reflection, transmission, and transmission polarization ratio of a one-dimensional aluminum-boron carbide grating obtained by the simulation when light is incident from the grating surface in the third embodiment.

Referring to FIGS. 7 and 8, for a one-dimensional aluminum-boron carbide grating, when light is incident from the grating surface, the reflection of TE light is suppressed, with a high transmission polarization suppression ratio.

FIG. 7 shows a schematic structure diagram of a one-dimensional aluminum-boron carbide grating. The lower layer of the polarization beam splitter is the first grating composed of the first metal aluminum and the first mediums (which are air, PMMA, or $SiO_2$). The direction of the grating period is along the x-axis, the aluminum lines extend along the y-axis direction, and the period P1 is 100 nm. The metal aluminum lines each have a width of half the period (that is, w1=50 nm), and a thickness h1 of 120 nm. The first materials on the aluminum lines are boron carbide, with a thickness h2 of 60 nm.

FIG. 8 shows spectrum charts of reflection, transmission, and absorption in the visible light range obtained through the commercial software COMSOL, as well as simulation results of the transmission polarization ratio. Light is incident from the grating surface, and the simulation results show that the reflection efficiency of TE light is from 5% to 35%, the transmission efficiency of TM light is from 50% to 82%, and the transmission polarization suppression ratio is from 8,500 to 16,200.

Embodiment 4

Figure 9:
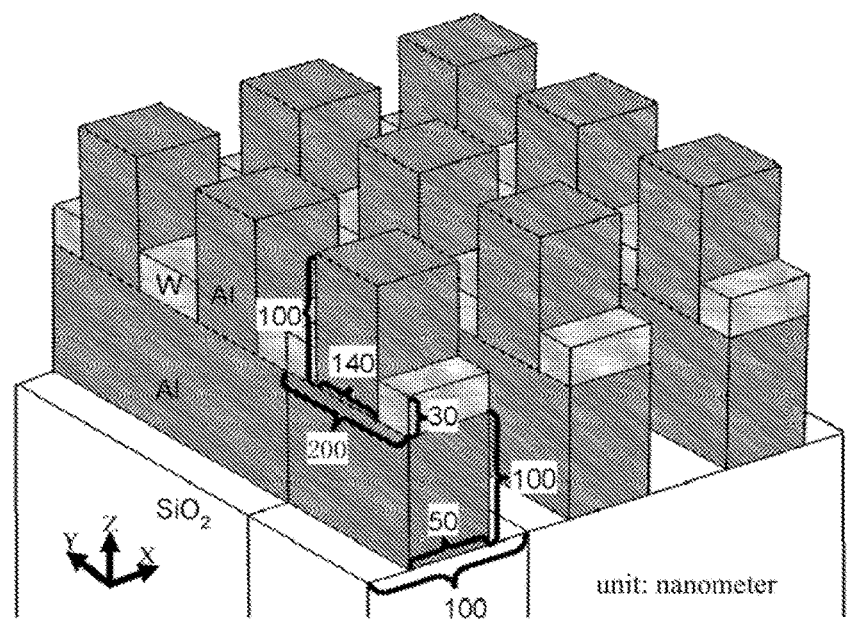
FIG. 9 is a schematic diagram of a fourth embodiment of the metal grating polarization beam splitter.
Figure 10:
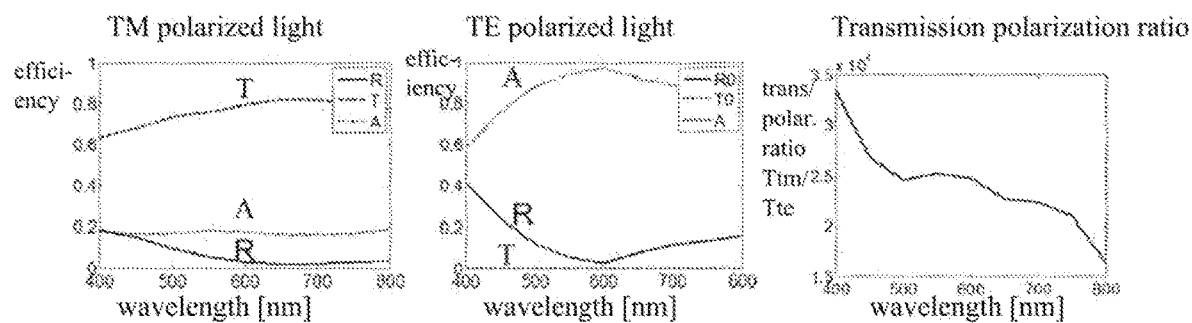
FIG. 10 shows spectrum charts of reflection, transmission, and transmission polarization ratio of a composite grating where a second grating is an aluminum-tungsten composite structure, obtained by the simulation through a finite element software in the fourth embodiment.

Referring to FIGS. 9 and 10, a second grating is an aluminum-tungsten composite structure, light is incident from the grating surface, and a high transmission polarization ratio is obtained while the TE reflection is decreased to less than 20%.

FIG. 9 shows a schematic structure diagram of a composite grating. The first grating composed of the first metal aluminum and the first mediums (which are air, PMMA, PC, PET, or $SiO_2$) has a period P1 of 100 nm, and the aluminum lines each have a width w1 of 50 nm. The second grating composed of the second material aluminum on the upper layer and the second mediums (which are air, PMMA (polymethyl methacrylate), $SiO_2$ (silicon dioxide), PC (polycarbonate), or PET (polyester resin)) has a period P2 of 200 nm. In each period, a second material aluminum line has a length w2 of 140 nm and a thickness h2 of 100 nm, a first light-absorbing material tungsten line at the bottom of the second medium has a length of 60 nm and a thickness h3 of 30 nm, and their widths both are the same as that of the aluminum line on the lower layer, of 50 nm.

Referring to FIG. 10, the simulation results show that TM light with a wavelength of above 540 nm has a transmittance of about 80%, and TM light with a short wavelength has a slightly lower transmittance of about 62%. TE light with a wavelength of from 420 nm to 700 nm has a reflection efficiency decreased to below 20%. There is a very high transmission polarization ratio of 17,000 to 33,000.

Embodiment 5

Figure 11:
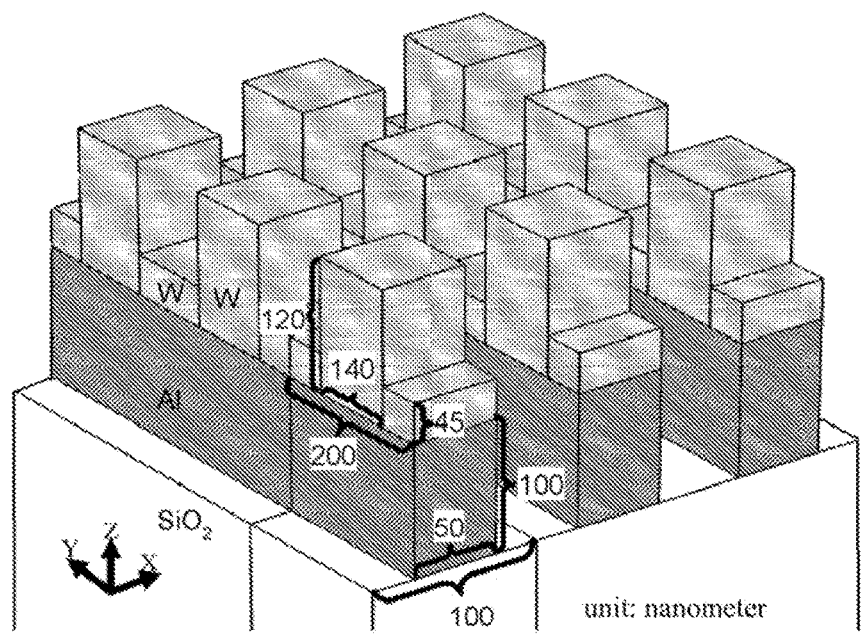
FIG. 11 is a schematic diagram of a fifth embodiment of the metal grating polarization beam splitter.
Figure 12:
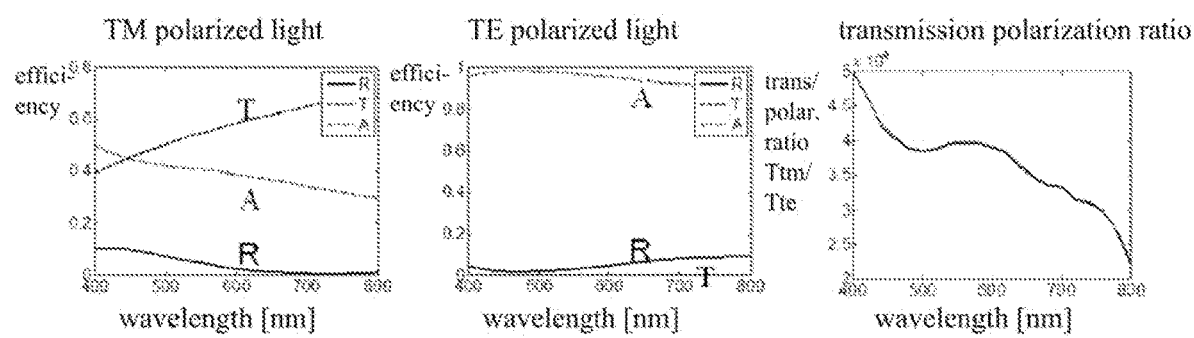
FIG. 12 shows spectrum charts of reflection, transmission, and transmission polarization ratio of a composite grating where a second grating is a tungsten grating, obtained by the simulation when light is incident from the grating surface in the fifth embodiment.

Referring to FIGS. 11 and 12, the second grating is a one-dimensional tungsten grating, and a low TE reflection and a high transmission polarization suppression ratio are obtained.

FIG. 11 shows a schematic structure diagram of a one-dimensional tungsten grating being superimposed onto a one-dimensional aluminum grating. The first grating composed of the first metal aluminum and the first medium (which is air, PMMA, or $SiO_2$) has a period P1 of 100 nm, and the aluminum lines each have a width w1 of 50 nm. The second grating composed of the second material tungsten on the upper layer and the second medium (which is air, PMMA, PC, PET, or $SiO_2$) has a period P2 of 200 nm. In each period, a second material tungsten line has a length w2 of 140 nm and a thickness h2 of 120 nm, a first light-absorbing material tungsten line at the bottom of the second medium (air) has a length of 60 nm and a thickness h3 of 45 nm, and their widths both are the same as that of the aluminum line on the lower layer, of 50 nm.

FIG. 12 shows spectrum charts of reflection, transmission, and absorption in the visible light range obtained through the commercial software COMSOL, as well as simulation results of the transmission polarization ratio. Light is incident from the grating surface, and the simulation results show that TE light and TM light both have a reflection efficiency of below 10%, and the transmission polarization ratio is as high as 22,000 to 50,000.

Embodiment 6

Figure 13:
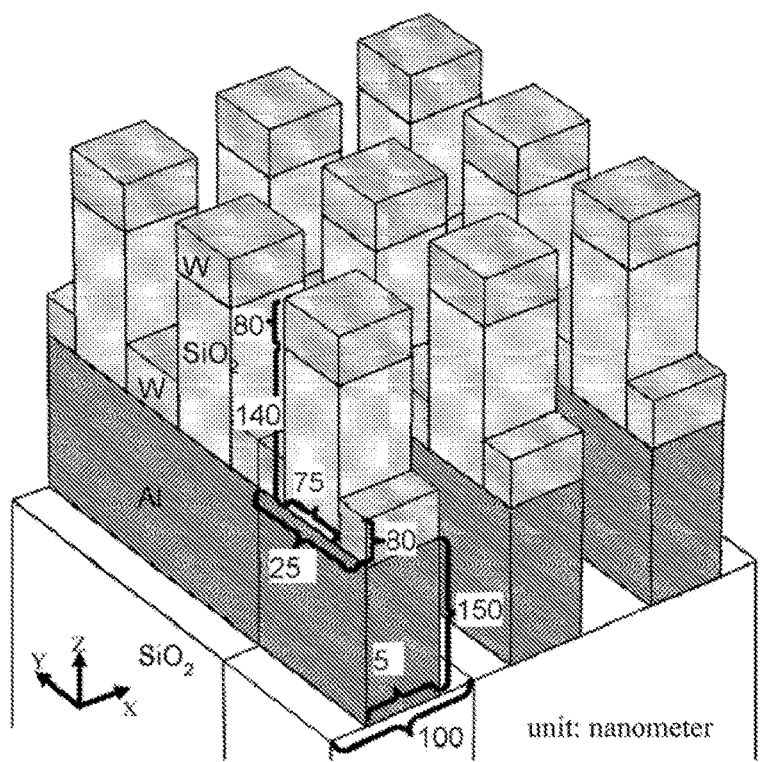
FIG. 13 is a schematic diagram of a sixth embodiment of the metal grating polarization beam splitter.
Figure 14:
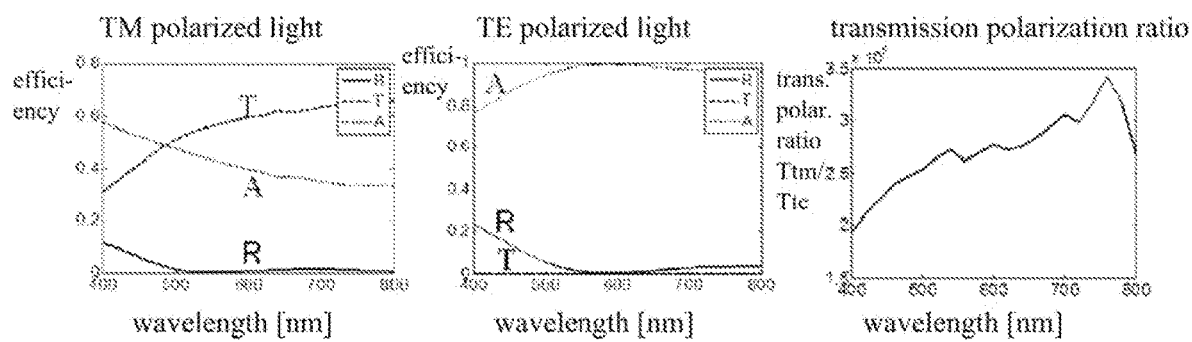
FIG. 14 shows spectrum charts of reflection, transmission, and transmission polarization ratio of a composite grating where a second grating is a medium-tungsten grating, obtained by the simulation when light is incident from the grating surface in the sixth embodiment.

Referring to FIGS. 13 and 14, the second grating is a medium-tungsten composite structure, and a low TE reflection and a high transmission polarization suppression ratio are obtained.

FIG. 13 shows a schematic structure diagram of a composite grating. The first grating composed of the first metal aluminum and the first mediums (which are air, PMMA (polymethyl methacrylate), $SiO_2$ (silicon dioxide), PC (polycarbonate), quartz, or PET (polyester resin)) has a period P1 of 100 nm, the grating direction is along the x-axis, and the aluminum lines each extend along the y-axis direction and have a width w1 of 50 nm. The second grating composed of the second material silicon dioxide on the upper layer and the second mediums (which are air, PMMA, PET, PC, quartz or $SiO_2$) has a period P2 of 250 nm. In each period, a second material silicon dioxide line has a length w2 of 75 nm and a thickness h2 of 140 nm, a second light-absorbing material tungsten on the top of the second material silicon dioxide has a thickness h4 of 80 nm, a first light-absorbing material tungsten line at the bottom of the second medium (air) has a length of 175 nm and a thickness h3 of 80 nm, and their widths all are the same as that of the aluminum line on the lower layer, of 50 nm.

FIG. 14 shows spectrum charts of reflection, transmission, and absorption in the visible light range obtained through the commercial software COMSOL, as well as simulation results of the transmission polarization ratio. Light is incident from the grating surface, and the simulation results show that TE light with a wavelength of greater than 500 nm has a reflection efficiency of less than 4%, TM light with a wavelength of greater than 500 nm has a reflection efficiency of less than 2%, and the transmission polarization ratio is from 20,000 to 35,000.

Embodiment 7

Figure 15:
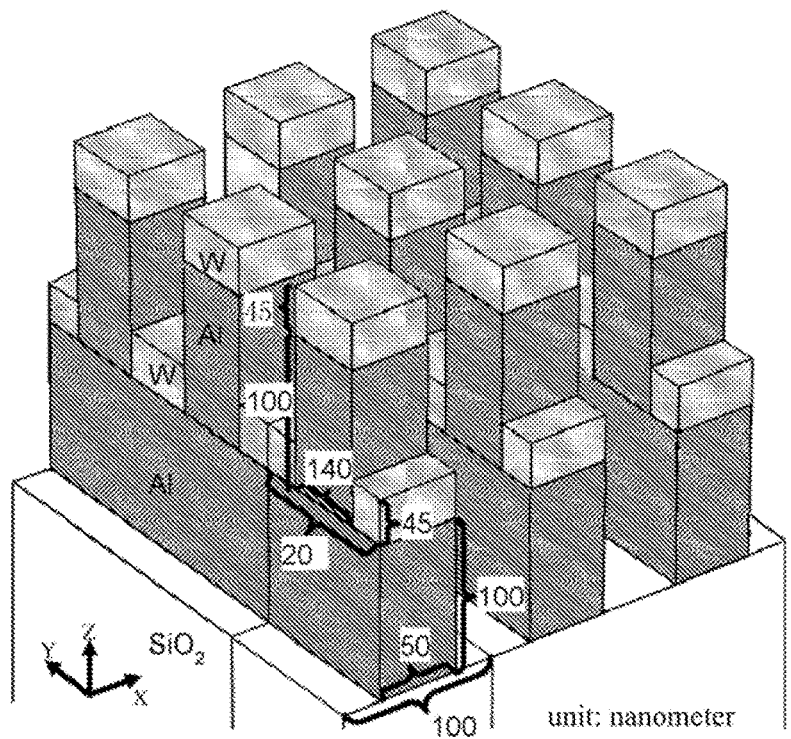
FIG. 15 is a schematic diagram of a seventh embodiment of the metal grating polarization beam splitter.
Figure 16:
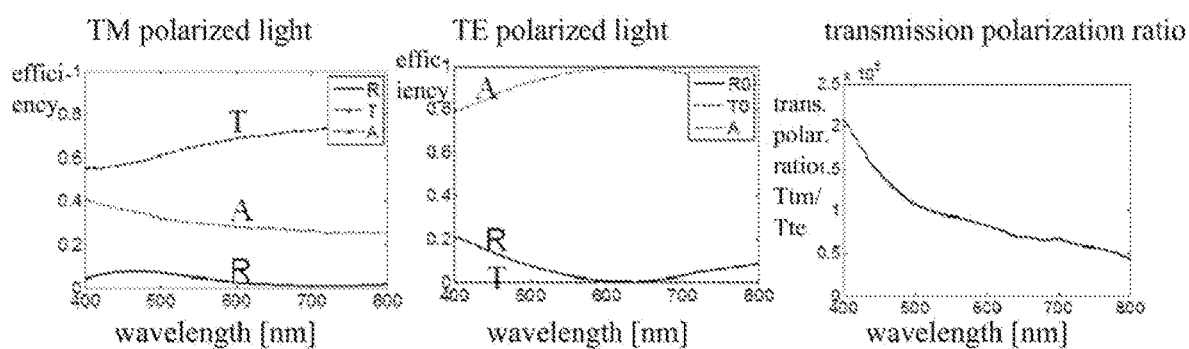
FIG. 16 shows spectrum charts of reflection, transmission, and transmission polarization ratio of a composite grating where a second grating is an aluminum-tungsten grating, obtained by the simulation when light is incident from the grating surface in the seventh embodiment.

Referring to FIGS. 15 and 16, the second grating is an aluminum-tungsten composite structure, and a low TE reflection and a high transmission polarization suppression ratio are obtained.

FIG. 15 shows a schematic structure diagram of a composite grating. The first grating composed of the first metal aluminum and the first medium (which is air, PMMA (polymethyl methacrylate), $SiO_2$ (silicon dioxide), PC (polycarbonate), quartz, or PET (polyester resin)) has a period P1 of 100 nm, the grating direction is along the x-axis, and the aluminum lines extend along the y-axis direction and have a width w1 of 50 nm. The second grating composed of the second material aluminum on the upper layer and the second medium (which is air, PMMA (polymethyl methacrylate), $SiO_2$ (silicon dioxide), PC (polycarbonate), quartz, or PET (polyester resin)) has a period P2 of 200 nm. In each period, a second material aluminum line has a length w2 of 140 nm and a thickness h2 of 100 nm, a second light-absorbing material on the top of the second material aluminum has a thickness h4 of 45 nm, a first light-absorbing material line at the bottom of the second medium (air) has a length of 60 nm and a thickness h3 of 45 nm, and their widths all are the same as that of the aluminum line on the lower layer, of 50 nm.

FIG. 16 shows spectrum charts of reflection, transmission, and absorption in the visible light range obtained through the commercial software COMSOL, as well as simulation results of the transmission polarization ratio. Light is incident from the grating surface. The simulation results show that TM light has a high transmittance of 55% to 75%, TE light with a wavelength of 500 nm to 800 nm has a reflection efficiency reduced to below 10%, TE light with a short wavelength has also a reflection efficiency of below 20%, and the transmission polarization ratio is as high as 50,000-200,000. The shorter the wavelength, the higher the transmission polarization ratio.

Embodiment 8

Figure 17:
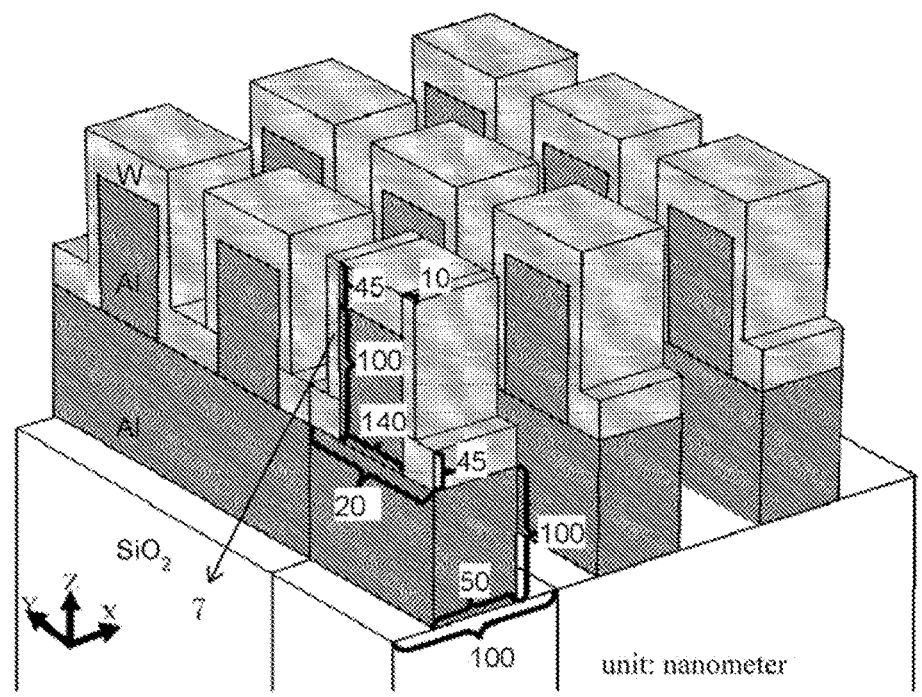
FIG. 17 is a schematic diagram of an eighth embodiment of the metal grating polarization beam splitter.
Figure 18:
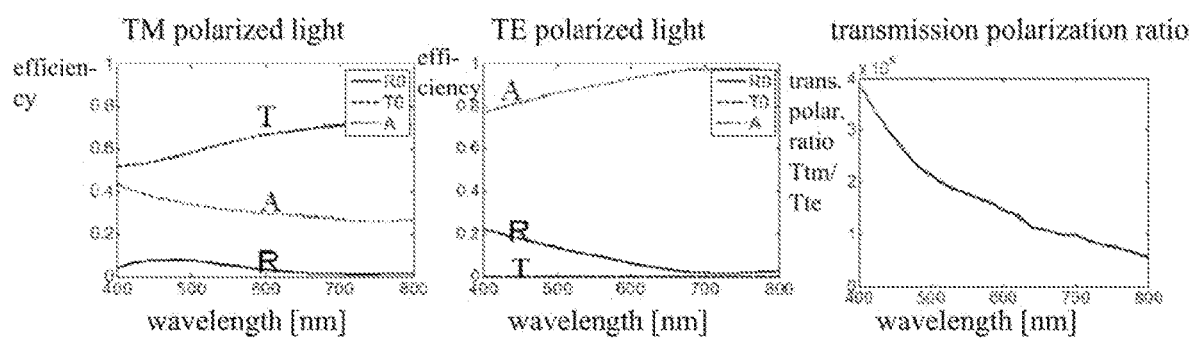
FIG. 18 shows spectrum charts of reflection, transmission, and transmission polarization ratio of a composite grating where a second grating is a medium-tungsten grating with sidewalls, obtained by the simulation when light is incident from the grating surface in the eighth embodiment.

Referring to FIGS. 17 and 18, based on Embodiment 6, second light-absorbing material sidewalls 7 with a thickness of 10 nm are attached to the aluminum line edges of the second grating. The second light-absorbing material sidewalls 7 are made of metal tungsten. Light is incident from the grating surface, and a low TE reflection and a high transmission polarization suppression ratio are obtained.

FIG. 17 shows a schematic structure diagram of a composite grating, in which tungsten layers with a width of 10 nm are superimposed onto the sides of the second material aluminum, based on Embodiment 6.

FIG. 18 shows spectrum charts of reflection, transmission, and absorption in the visible light range obtained through the commercial software COMSOL, as well as simulation results of the transmission polarization ratio. The simulation results show that TM light has a transmittance maintained at 55% to 75%, TE light with a wavelength of 500 nm to 800 nm has a reflection efficiency of below 10%, TE light with a short wavelength has a reflection efficiency of below 20%, and the transmission polarization ratio is as high as 55,000 to 380,000. The shorter the wavelength, the higher the transmission polarization ratio.

Finally, it should be explained that the above embodiments are only used to illustrate the technical solutions of the invention instead of limiting them. Although the invention has been described in detail with reference to the aforementioned embodiments, those skilled in the art should understand that it is still possible to modify the technical solutions recorded in the aforementioned embodiments or equivalently replace some of the technical features, and these modifications or replacements do not separate the essence of the corresponding technical solutions from the spirit and scope of the technical solutions of the embodiments of the invention.

We claim:

1. A reflection-asymmetric metal grating polarization beam splitter, comprising
a substrate (1) comprising an upper surface,
a plurality of first mediums (2),
a plurality of first metals (3),
a plurality of second materials (5.a),
light-absorbing materials, and
second mediums (4.b),
wherein the plurality of the first metals (3) and the plurality of the first mediums (2) are provided transversely on the upper surface of the substrate (1) side by side at equal intervals to form a first metal grating, the first metal grating is a zero-order diffraction grating for an incident light,
each of the first medium slits is set at a width that is less than a first cutoff wavelength where TE polarized light in the incident light with a working wavelength greater than the first cutoff wavelength does not transmit through the first metal grating under activated surface plasmon mode while TM polarized light in the incident light is transmitted by passing through the first medium slits under the activated surface plasmon mode,
the first metals (3) are provided with the plurality of the second materials (5. a) at equal intervals longitudinally along upper surfaces of the first metals (3) to form a second grating,
the light-absorbing materials are closely provided on the upper surfaces of the first metals (3) between two adjacent second materials (5. a), the second mediums (4. b) are filled in spaces between the adjacent second materials (5. a) above the light-absorbing materials,
the second grating is a zero-order diffraction grating for the incident light, and
each of the second medium (4. b) slits is set at a width that is less than a second cutoff wavelength where the TM polarized light in the incident light does not transmit through the second medium (4. b) slits.

2. The beam splitter according to claim 1, wherein the light-absorbing materials comprise first light-absorbing materials (4. a) and second light-absorbing materials (5. b),
the first light-absorbing materials (4. a) are closely provided on the upper surfaces and/or side surfaces of the first metals (3) between the two adjacent second materials (5. a), and
the second light-absorbing materials (5. b) are closely provided on upper surfaces of the second materials (5. a) lines, and the second mediums (4. b) are filled in spaces between the adjacent second materials (5.a) above the first light-absorbing materials (4. a).

3. The beam splitter according to claim 2, wherein on the same first metal (3) line, second light-absorbing material sidewalls (7) are closely provided on longitudinal sidewall surfaces of the second materials (5. a).

4. The beam splitter according to claim 1, wherein the substrate (1) is a material transparent to the working waveband, the first mediums (2) and the second mediums (4. b) are a material transparent to incident light, the first metals (3) are aluminum, the second materials (5. a) are aluminum, metal tungsten or silicon dioxide, and the light-absorbing materials are a material that exhibits metallicity at the working waveband.

5. The beam splitter according to claim 2, wherein the substrate (1) is a material transparent to incident light, the first mediums (2) and the second mediums (4. b) are air or a material transparent to incident light, the first metals (3) are aluminum, the second materials (5. a) are aluminum, metal tungsten or silicon dioxide, and the first light-absorbing materials (4. a) and the second light-absorbing materials (5. b) are tungsten, gallium arsenide, boron carbide or composite materials thereof.

6. The beam splitter according to claim 1, wherein the working wavelength of the incident light is about 400 to 800 nm.

* * * * *